United States Patent
Magarey et al.

(10) Patent No.: US 6,947,590 B2
(45) Date of Patent: Sep. 20, 2005

(54) METHOD FOR AUTOMATIC SEGMENTATION OF IMAGE DATA FROM MULTIPLE DATA SOURCES

(75) Inventors: Julian Frank Andrew Magarey, Cremorne (AU); Brian John Parker, North Ryde (AU)

(73) Assignee: Canon Kabushiki Kaisha, Tokyo (JP)

(*) Notice: Subject to any disclaimer, the term of this patent is extended or adjusted under 35 U.S.C. 154(b) by 661 days.

(21) Appl. No.: 09/920,958

(22) Filed: Aug. 3, 2001

(65) Prior Publication Data

US 2002/0041710 A1 Apr. 11, 2002

(30) Foreign Application Priority Data

Aug. 4, 2000 (AU) .............................................. PQ9218

(51) Int. Cl.$^7$ .............................. G06K 9/00; G06K 9/34
(52) U.S. Cl. ...................... 382/164; 382/173; 382/226; 382/228
(58) Field of Search ................................ 382/162, 164, 382/171, 173, 176–180, 191, 225, 226–228

(56) References Cited

U.S. PATENT DOCUMENTS

| 5,631,970 A | | 5/1997 | Hsu ........................... 382/113 |
| 5,845,013 A | * | 12/1998 | Bouchard et al. ........... 382/242 |
| 5,877,998 A | * | 3/1999 | Aidala et al. ................ 367/124 |

FOREIGN PATENT DOCUMENTS

| AU | 199952618 B2 | 4/2000 | ............. G06T/9/00 |
| EP | 0 579 319 B1 | 4/1998 | ............. H04N/7/24 |

OTHER PUBLICATIONS

IBM Technical Disclosure Bulletin, Dec. 1991, U.S., vol. 34, No. 7B, pp. 264–265.*
Shen et al. ("Segmentation of 2D and 3D Images through a Hierarchical Clustering Based on Region Modeling," Proc. Int'l Conf. On Image Processing, vol. 3, pp 50–53, Oct. 26–29, 1997).*
Koepfler et al. ("A Multiscale Algorithm for Image Segmentation by Variational Method," SIAM J. Numerical Analysis, vol. 31, No. 1 pp 282–299, Feb. 1994).*
"Region–Based Representations of Image and Video: Segmentation Tools For Multimedia Services", P. Salembier et al., IEEE Transactions On Circuits and Systems For Video Technology, vol. 9, No. 8, pp 1147–1169, Dec. 1999.

* cited by examiner

Primary Examiner—Yon J. Couso
Assistant Examiner—Yubin Hung
(74) Attorney, Agent, or Firm—Fitzpatrick, Cella, Harper & Scinto

(57) ABSTRACT

A method (300) and apparatus (400) is described for segmenting an image (102). Starting with each pixel of the image (102) being a separate region, segments are formed by merging the regions. As merging proceeds, a merging cost of the regions being merged generally increases. This increase however is not purely monotonic as the overall rise in the merging cost is punctuated by departures from monotonicity. A complete pass is made through the segmentation, in which all regions are merged until only one remains. By analysing the points immediately after significant departures from monotonicity, a final segmentation stopping value ($\lambda_{stop}$) is chosen as being the last return to monotonicity from such a significant departure. Segmentation is repeated until the merging cost reaches the final segmentation stopping value ($\lambda_{stop}$).

33 Claims, 4 Drawing Sheets

METHOD FOR AUTOMATIC SEGMENTATION OF IMAGE DATA FROM MULTIPLE DATA SOURCES

FIELD OF INVENTION

The present invention relates to automatic scene analysis and, in particular, to a statistical-model-based segmentation of multichannel image data.

BACKGROUND

Modern imaging devices are capable of generating vast amounts of image data in the form of two-dimensional arrays of samples (known as pixels) of some measurable quantity. Examples of directly measurable image data include luminance and chrominance of reflected light (from optical cameras), range or distance from some reference point to the imaged points (from active range sensors), or density (from tomographic scanners). Moreover, many quantities can be derived from the raw image data. Such quantities may be referred to as metadata, this being data that is used to describe other data. Examples of such "metadata" quantities include range (from passive, is optical range sensors) and motion (from multiple images of dynamic scenes).

The sheer volume of image data necessitates some kind of automatic analysis of content in most applications. An important step in analysing the content of an imaged scene is to partition the image into disjoint segments corresponding to semantically meaningful objects. Because human expectation is that real world objects are in some sense compact and coherent, each segment of the partitioned image consists of a region of adjacent pixels over which some property of the data (image data, metadata, or both) is uniform. Many approaches to this task of segmentation have been tried. One that has met with some success is region merging. In this paradigm, each pixel is initially labelled as its own unique region. Adjacent regions are then compared using some similarity criterion and merged if they are sufficiently similar In this way small regions take shape and are gradually built into larger ones. It may be shown that region merging is a practical approximate solution to a variational formulation of the image segmentation problem. In this formulation, the "best" segmentation is expressed as the global minimum of some cost functional defined over the space of all possible segmentations of an image. An advantage of region merging methods (as compared with, for example, edge-based methods) is the adaptability of region merging to handle multichannel image data, ie. data which is vector-valued at each pixel. For example, in colour images the vector components might be the red, green, and blue intensities. This facility makes region merging techniques suitable for fusing multiple sources of data and metadata to produce a single segmentation. In this way range and motion information may be integrated with colour to provide an analysis that colour data alone cannot, This is of particular interest when the images are of complex, dynamic scenes. An example of such is disclosed in the paper "*Region-based Representation of Image and Video: Segmentation Tools for Multimedia Services*", P. Salembier, F. Marques; IEEE Transactions on Circuits and Systems for Video Technology Vol. 9, No. 8, December 1999, pages 1147–1169.

Traditional region merging has dealt with the definition of segmentation functionals and/or similarity criteria. Most successful cost functionals have two components: a model fitting cost and a model complexity cost. The model fitting cost encourages a proliferation of regions, while the complexity cost encourages few regions The functional must therefore balance the two components to achieve a reasonable result. The most soundly based model fitting costs use statistically valid definitions such as residuals. This provides optimal handling of data or metadata which is subject to spatially varying uncertainty. This situation often arises from metadata such as range obtained by passive optical means, when the certainty of the range estimate depends strongly on the underlying image texture.

Traditional statistical region merging has assumed all channels have independent, identically distributed uncertainties. Instances where the uncertainties of each channel are unequal and/or correlated between channels have not been addressed. However this will be the case when fusing pixel data and derived metadata such as range. A similar situation also occurs when segmenting on estimated motion vector images, in which the uncertainties not only vary over the image, but are correlated between horizontal and vertical components, Another difficulty with automatic segmentation by region merging is deciding when to halt the merging process. Some implementations have required a predetermined "schedule" of thresholds to govern the merging process and converge to the segmentation which minimises the cost functional. Others have removed the need for a schedule, but still require an arbitrary threshold. This threshold is related to the weighting of fitting error and model complexity in the final cost functional. The use of a predetermined arbitrary threshold means the segmentation algorithm is unable to adapt to different types of image without substantial operator effort.

SUMMARY OF THE INVENTION

It is an object of the present invention to substantially overcome or at least ameliorate one or more problems associated with existing arrangements.

The problems mentioned above may be addressed by explicitly formulating the cost functional to incorporate different and correlated uncertainties between channels, and providing a flexible, meaningful automatic halting criterion for the merging process.

In accordance with one aspect of the present invention there is disclosed a method for segmenting an image formed by a plurality of pixels using a region-merging process characterised by using covariance data and a plurality of vector components of each said pixel to evaluate a merging criterion for regions of said image.

In accordance with another aspect of the present invention there is disclosed a method for segmenting an image formed by a plurality of pixels, each said pixel being described by a vector having components each relating to a different measured image characteristic, said method comprising the steps of:

(a) receiving, for each said pixel, a plurality of said vector components and a corresponding error covariance representation of said pixel;

(b) for each said pixel, fitting each said component and the corresponding covariance representation to a predetermined linear model to obtain a set of model parameters and corresponding confidence representations;

(c) statistically analysing the sets of model parameters and corresponding confidence representations to derive a segmentation of said image that minimises a predetermined cost function.

In accordance with another aspect of the present invention there is disclosed a method for unsupervised selection of a stopping point for a region-merging segmentation process, said method comprising the steps of:

(a) analysing a graph of merging cost values to identify departures from substantial monotonicity of said graph; and (b) selecting said stopping point to be a merging cost value corresponding to a return to monotonicity of said graph, said selected stopping point being associated with one of a limited plurality of final said departures in said region merging process.

Other aspects of the present invention are also disclosed.

BRIEF DESCRIPTION OF THE DRAWINGS

One or more preferred embodiment of the present invention will now be described with reference to the drawings in which.

DETAILED DESCRIPTION

Figure 1:
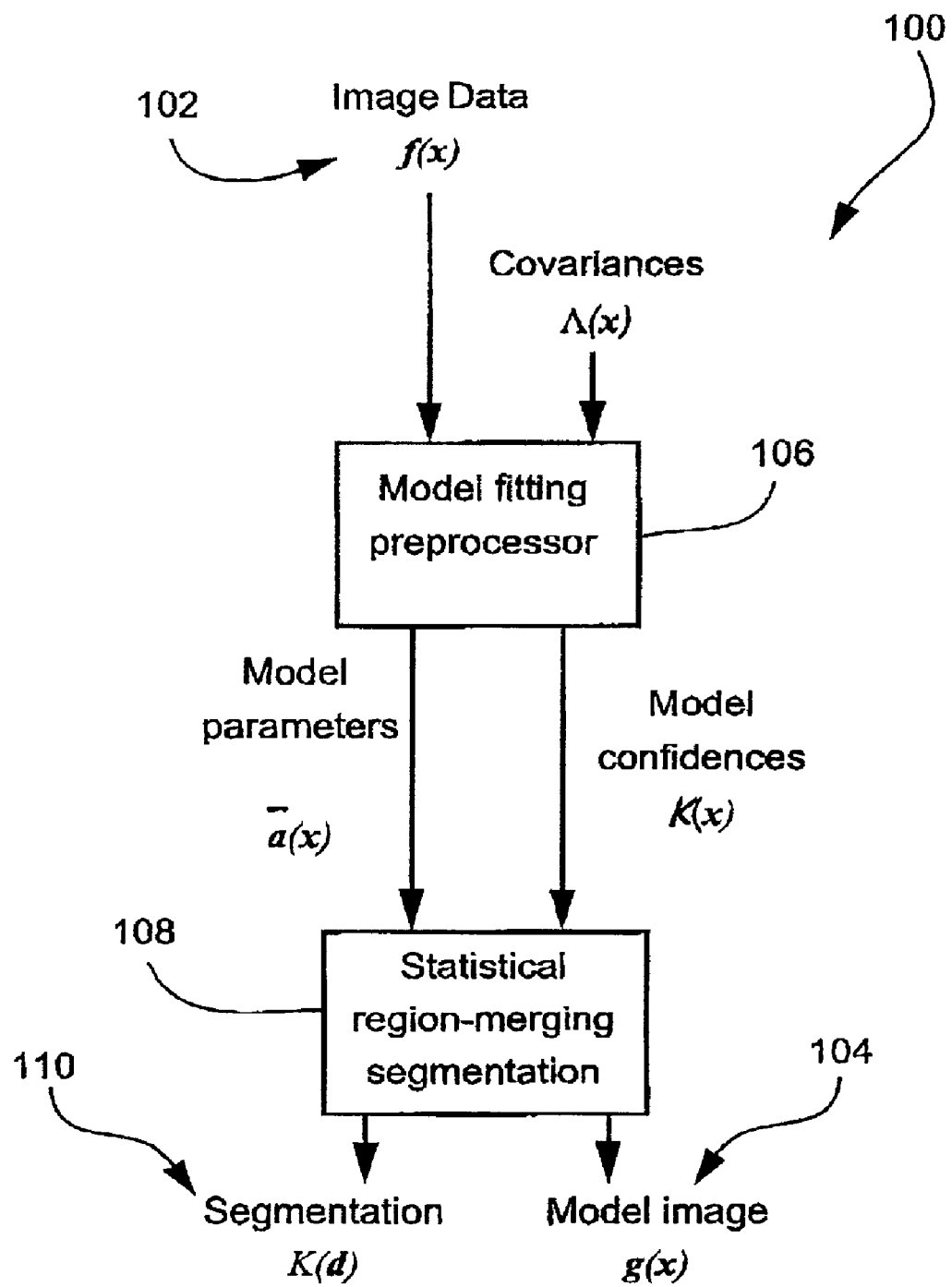
FIG. 1 is a block diagram showing the structure of the preferred implementation.

Some portions of the description which follows are explicitly or implicitly presented in terms of algorithms and symbolic representations of operations on data within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that the above and similar terms are to be associated with the appropriate physical quantities and are merely convenient labels applied to these quantities. Unless specifically stated otherwise, and as apparent from the following, it will be appreciated that throughout the present specification, discussions utilizing terms such as "scanning", "calculating", "determining", "replacing", "generating", "initializing", "outputting", or the like, refer to the action and processes of a computer system, or similar electronic device, that manipulates and transforms data represented as physical (electronic) quantities within the registers and memories of the computer system into other data similarly represented as physical quantities within the computer system memories or registers or other such information storage, transmission or display devices.

The present specification also discloses apparatus for performing the operations of the methods. Such apparatus may be specially constructed for the required purposes, or may comprise a general-purpose computer or other device selectively activated or reconfigured by a computer program stored in the computer. The algorithms and displays presented herein are not inherently related to any particular computer or other apparatus. Various general-purpose machines may be used with programs in accordance with the teachings herein. Alternatively, the construction of more specialized apparatus to perform the required method steps may be appropriate. The structure of a conventional general-purpose computer will appear from the description below.

In addition, the present specification also discloses a computer readable medium comprising a computer program for performing the operations of the methods. The computer readable medium is taken herein to include any transmission medium for communicating the computer program between a source and a designation. The transmission medium may include storage devices such as magnetic or optical disks, memory chips, or other storage devices suitable for interfacing with a general purpose computer. The transmission medium may also include a hard-wired medium such as exemplified in the Internet system, or wireless medium such as exemplified in the GSM mobile telephone system. The computer program is not intended to be limited to any as particular programming language and implementation thereof It will be appreciated that a variety of programming languages and coding thereof may be used to implement the teachings of the arrangements described herein.

With reference to FIG. 1, the preferred implementation comprises a processing algorithm 100 which may be implemented in a programmable device such as a digital computer. One set of inputs 102 to the algorithm are components $f_i(x)$ of the vector of measurements at each pixel x. These components may each be derived from the same source (for example, the colour channels of an RGI image sensor), or from different sources (for example a range map produced by a passive optical range sensor, along with the corresponding intensity image). The number of components is referred to throughout as m, and the column-vector of measurements at each pixel is written as f(x).

The pixel lattice is a regular two-dimensional (2D) grid, with each interior pixel having four neighbours, those being pixels directly above, below, and to the left and right of the pixel in question. Pixels at the periphery of the lattice each have two or three neighbours. Separating each pair of neighbours or adjacent pixels is a boundary element or edgel.

An assumption underlying the segmentation problem is that each measurement f(x) is associated with a particular state. The form of the state (or the model) must be decided in advance, but (unknown) parameters of the state are contained in a state vector of length n, containing model parameters. Each state is assumed to be valid over a connected region of pixels. A connected region is one in which each pixel in the region can be reached from every other pixel via a neighbourhood relation. Such a requirement forbids disjoint regions. The aim of segmentation is to identify these regions and the prevailing state (ie. the model parameters) for each region. Together, these quantities specify a model image g(x), representing a desired output 104 of the processing algorithm 100.

The neighbourhood or adjacency rule for pixels, known per se in the art, extends to the regions. That is, a region is said to be adjacent to another region if some pixel in the first region is a neighbour of any pixel in the second region.

Let us index the regions by the integer j, and denote each (connected) region of pixels as $\Omega_j$, over which the state is specified by the n-vector $a_j$ of model parameters. The size of $\Omega_j$ shall be denoted by $n_j$. For the purposes of the preferred implementation, the model image over each region is assumed to be a linear projection of the model parameters for that region:

$$g(x)=A(x)a_j, \quad x \in \Omega_j \qquad (1)$$

where $A(x)$ is a known m by n matrix which encapsulates the nature of the model.

Each actual measurement is subject to a random error $e(x)$ such that $$f(x)=g(x)+e(x) \qquad (2)$$

The error may be assumed to be drawn from a zero-mean normal (Gaussian) distribution with covariance $\Lambda(x)$:

$$e(x) \sim N(0, \Lambda(x)) \qquad (3)$$

The m by m covariance matrix $\Lambda(x)$ at each pixel is an additional input to the algorithm (see FIG. 1). In traditional arrangements, it has been assumed that each component of $e(x)$ is independently and identically distributed, i.e.:

$$\Lambda(x)=\sigma^2(x)I_m \qquad (4)$$

However, the preferred implementation generalises this to encompass disparate and possibly mutually dependent measurement error components.

Variational Formulation of the Segmentation Problem

Variational segmentation requires that a cost function E be assigned to each possible segmentation. A model-based segmentation of an image is completely described by the model image $g(x)$, which is defined by the list of regions and the model parameters prevailing over each region. A partition into regions may be compactly described by a binary function $K(d)$ on the edgels, in which the value one (1) is assigned to each edgel d bordering a region. This function is referred to as an edge map. It should be noted that because of the requirement of region connectedness, not every edge map defines a valid segmentation.

The preferred implementation defines a cost functional in a traditional fashion in which the model fitting error is balanced with the overall complexity of the model. The sum of the statistical residuals of each region is used as the model fitting error. Combining Equations (1), (2), and (3), the residual over region j as a function of the to model parameters $a_j$ is given by $$E_j(a_j) = \sum_{x \in \Omega_j} [f(x) - A(x)a_j]^T \Lambda^{-1}(x) [f(x) - A(x)a_j] \qquad (5)$$

The model complexity is simply the number of region-bounding edgels. Hence the overall cost functional may defined as $$E(g, K, \lambda) = \sum_j E_j(a_j) + \lambda \sum_d K(d), \qquad (6)$$

where the (non-negative) parameter $\lambda$ controls the relative importance of model fitting error and model complexity. The aim of variational segmentation is to find the minimising arguments $\bar{g}$ and $\bar{K}$ of E, for a given $\lambda$ value.

Note that if the region boundaries are given as a valid edge map K the minimising model parameters $\bar{a}_j$ over each region j may be found by minimising $E_j$. This may be evaluated using a simple weighted linear least squares calculation. Given this fact, any valid edge map K will fully and uniquely describe a segmentation. Therefore, E may be regarded as a function over the space of valid edge maps (K-space), whose minimisation yields the optimal region partition $\bar{K}(\lambda)$. The corresponding model parameters may then be assumed to be those which minimise the residuals $E_j$ over each region. The corresponding minimum residuals will hereafter be written as $\bar{E}_j$.

The parameter $\lambda$ is clearly critical to the appearance of the result. At one extreme, the global minimiser $\bar{K}(0)$, where the model complexity is completely discounted, is the most trivial segmentation, in which every pixel constitutes its own region, and which gives zero model fitting error. On the other hand, the global minimiser $\bar{K}(\infty)$, where the model fitting error is completely discounted, is the null or empty segmentation in which the entire image is represented by a single region. Somewhere between these two extremes lies the segmentation which will appear ideal in that the regions correspond to a semantically meaningful partition. However, there is no prima facie method of choosing the corresponding $\lambda$, and even if $\lambda$ were given, the minimisation task remains extremely difficult. In this regard, a brute force method of evaluating E for every possible valid segmentation map K is computationally infeasible for images of size greater than a few pixels.

Approximate Solution by Region Merging

To find an approximate solution to the variational segmentation problem, the region-merging strategy has been employed. This strategy employs the concept of a 2-normal segmentation. A 2-normal segmentation is defined as one in which the cost functional increases after any 2 neighbouring regions are merged. Based on the idea that nearby valid edge maps in K-space share almost all of their region boundaries, a 2-normal segmentation is clearly a local minimum for the cost functional. Therefore an algorithm which finds a 2-normal segmentation for a given $\lambda$ is a good approximate solution to the variational formulation for that value of $\lambda$.

A second observation is that any 2-normal segmentation $K_0$ for a given $\lambda_0$ is a superset of a 2-normal segmentation $K_1$ for any $\lambda_1 > \lambda_0$. i.e. $K_0$ contains all the boundaries that $K_1$ does (as well as some others), In other words, a 2-normal segmentation for any $\lambda$ may be derived from any 2-normal segmentation for any smaller $\lambda$ just by merging adjacent regions. Knowing that the trivial segmentation is the global minimiser for the smallest possible $\lambda$ value of 0, from these two observations, an approximate solution to the variational formulation for ally given $\lambda$ may be determined according to the following steps:

1. Set k=0 and set $K_k = \bar{K}(0)$ (the trivial segmentation).
2. Increment k and set $\lambda = \lambda_k$.
3. Form a trial segmentation $K_k(ij)$ by merging any adjacent pair of regions i and j within the segmentation $K_k$.
4. Compare the cost functional $E(K_k(ij), \lambda_k)$ with $E(K_k, \lambda_k)$. If it is less, allow the merge by setting $K_k = K_k(ij)$, and $E(K_k, \lambda_k) = E(K_k(ij), \lambda_k)$.
5. Repeat steps 3 and 4 until no further merging is allowed. (A 2-normal segmentation has thus been achieved).
6. If $\lambda_k = \lambda$, halt; otherwise go to step 2.

The above algorithm requires a monotonically increasing $\lambda$-schedule $0 < \lambda_j < \ldots < \lambda_{kmax} = \lambda$. The minimising (2-normal) segmentation at each point in the schedule is used as the "starting guess" for the minimising segmentation at the succeeding point. Regions are grown by pairwise merging from the original, pixel level according to whether a given merge decreases the cost functional. If the schedule is gradual enough, the final segmentation $K_k$ should be close to the global minimiser $\overline{K}(\lambda)$ of E for the given, final $\lambda$ value.

Efficient Region Merging

Step 4 of the algorithm above requires the comparison of two cost functionals. It is desirable for this step to be carried out as efficiently as possible. The two segmentations differ in only two regions, so the test computation may be confined to those regions. By examining Equations (5) and (6), a test statistic for the adjacent region pair (i, j) may be written as $$t_{ij} = \frac{\overline{E}_{ij} - (\overline{E}_i + \overline{E}_j)}{l(\delta_{ij})} \tag{7}$$

where $l(\delta_{ij})$ is the length of the common boundary between regions i and j. If $t_{ij}$ (the merging cost) is less $\lambda_k$, the merge is allowed. The key to efficient region merging is to compute the numerator of $t_{ij}$ as fast as possible. First, let us rewrite Equation (5) as:

$$E_j(a_j) = (F_j - H_j a_j)^T K_j (F_j - H_j a_j) \tag{8}$$

where:

$H_j$ is an $(n_j m)$ by n matrix composed of the individual $A(x)$ matrices stacked on top of one another as x varies over region j;

$F_j$ is a column vector of length $(n_j m)$ composed of the individual $f(x)$ vectors stacked on top of one another;

$K_j$ is an $(n_j m)$ by $(n_j m)$ block diagonal matrix, where each m by m diagonal block is the inverse of the $\Lambda(x)$ matrix at the pixel denoted by the corresponding rows in $F_j$.

By weighted least squares theory, the minimising model parameter vector $\overline{a}_j$ is given by $$\overline{a}_j = K_j^{-1} H_j^T K_j F_j \tag{9}$$

where $K_j$ is the confidence in the parameter estimate, defined as the inverse of its covariance:

$$K_j = \Lambda_j^{-1} = H_j^T K_j H_j \tag{10}$$

The corresponding residual is given by $$\overline{E}_j = F^T{}_j K_j (I_{mn_j} - H_j K_j^{-1} H_j^T K_j) F_j \tag{11}$$

When merging two regions i and j, the "merged" matrix $H_{ij}$ is obtained by concatenating $H_i$ with $H_j$; likewise for $F_{ij}$ and $K_{ij}$. These facts may be used to show that the best fitting model parameter vector for the merged region is given by:

$$\overline{a}_{ij} = \overline{a}_i - K_{ij}^{-1} K_j (\overline{a}_i - \overline{a}_j) \tag{12}$$

where the merged confidence is $$K_{ij} = K_i + K_j \tag{13}$$

and the merged residual is given by $$\overline{E}_{ij} = \overline{E}_i + \overline{E}_j + (\overline{a}_i - \overline{a}_j)^T K_i K_{ij}^{-1} K_j (\overline{a}_i - \overline{a}_j) \tag{14}$$

Combining Equations (13) and (14), the test statistic $t_{ij}$ in Equation (7) may be computed as:

$$t_{ij} = \frac{(\overline{a}_i - \overline{a}_j)^T K_i (K_i + K_j)^{-1} K_j (\overline{a}_i - \overline{a}_j)}{l(\delta_{ij})} \tag{15}$$

from the model parameters and confidences of the regions to be merged. The matrix to be inverted is always of size n by n, (i.e. does not increase with region size). If the merge is allowed, Equations (12) and (13) give the model parameters and confidences of the merged region.

Note that under this strategy, only Equations (12), (13), and (15) need to be applied throughout the merging process. Only the model parameters and their confidences for each region are therefore required as segmentation proceeds. Further, neither the original measurements f(x) nor the model structure itself (i.e. the matrices A(x)) are required.

Statistical linear-model-based segmentation may thus be separated into two stages as seen in FIG. 1, those stages being an initial model fitting stage 106 where parameters $\overline{a}(x)$ and confidences K(x) are found for the data at each pixel, followed by a region merging stage 108. In the case of a zero-order model (n=1), the initial model-fitting stage is trivial:

$$\overline{a}(x) = f(x) \tag{16}$$

$$K(x) = \Lambda^{-1}(x). \tag{17}$$

In the case of higher-order models, model parameters and confidences at each pixel may be obtained in any manner desired. In the preferred implementation, they are estimated over a small window of pixels surrounding the pixel in question. The window size w must be sufficiently large, ie.

$$w \times m > n \tag{18}$$

to prevent under-determination of the model-fitting Equations (9) and (10). In the case where not all the window pixels actually belong to the same state, an estimation technique robust to "outliers" should be used. Robust estimation is a statistical technique known to those skilled in the art.

Removing the Need for a $\lambda$-Schedule.

Recall that the variational algorithm stated above in steps (1) to (6) requires a monotonically increasing $\lambda$-schedule $\lambda_1 < \ldots < \lambda$). At each point in the schedule, the algorithm searches at random over adjacent pairs and merges all those pairs whose test statistic is less than the schedule value. Only after no merges are possible may the algorithm advance to the next point in the schedule.

The need for a schedule may be removed by slightly reformulating the algorithm. Suppose at the initialisation stage all adjacent region pairs are determined and their corresponding test statistics evaluated. It is then possible to sort all pairs into a list in ascending order of the test statistic. Region merging then involves popping a pair off the top of the list (i.e. the pair with the lowest merging cost), merging this pair, deleting all the pairs containing either of the merged regions, evaluating a new test statistic for each pair containing the newly merged region, and reinserting these into the list at the appropriate point(s).

This modified region merging algorithm effectively provides a value at each merge operation—the test statistic $t_{ij}$ of the pair being merged. It is thus possible to build up a sequence of $t_{ij}$ values as the algorithm proceeds, using only the measurement data. The algorithm halts if this value exceeds a predetermined threshold $\lambda_{stop}$ at any time.

This new version of the algorithm may be shown to have complexity O(N log N) where N is the number of pixels in the image (assuming that the number of neighbouring regions remains small relative to N), provided the sorting and insertion can be done in "log time". This can be guaranteed if the list structure is maintained in computer memory in a structure called a heap or priority queue.

One problem, however, remains: the value of $\lambda_{stop}$ must be decided in advance. Otherwise the algorithm will continue to merge until the null segmentation is reached.

A suitable value of $\lambda_{stop}$ may be obtained by empirical means. In such an approach, an image or set of images deemed to be typical of the kind likely to be encountered by the algorithm are chosen as the training set. Different values of $\lambda_{stop}$ are trialed on the whole set until finally a value is obtained which produces segmentations in all or most of the training examples which correspond to those a human segmenter would achieve. There are two main disadvantages of this method. The first is the expense of training, which must be repeated every time a new data set is encountered. The second is the lack of flexibility since the results of applying the predetermined $\lambda_{stop}$ to an image which does not resemble the training set are unpredictable.

Automatic Determination of $\lambda_{stop}$.

Figure 3:
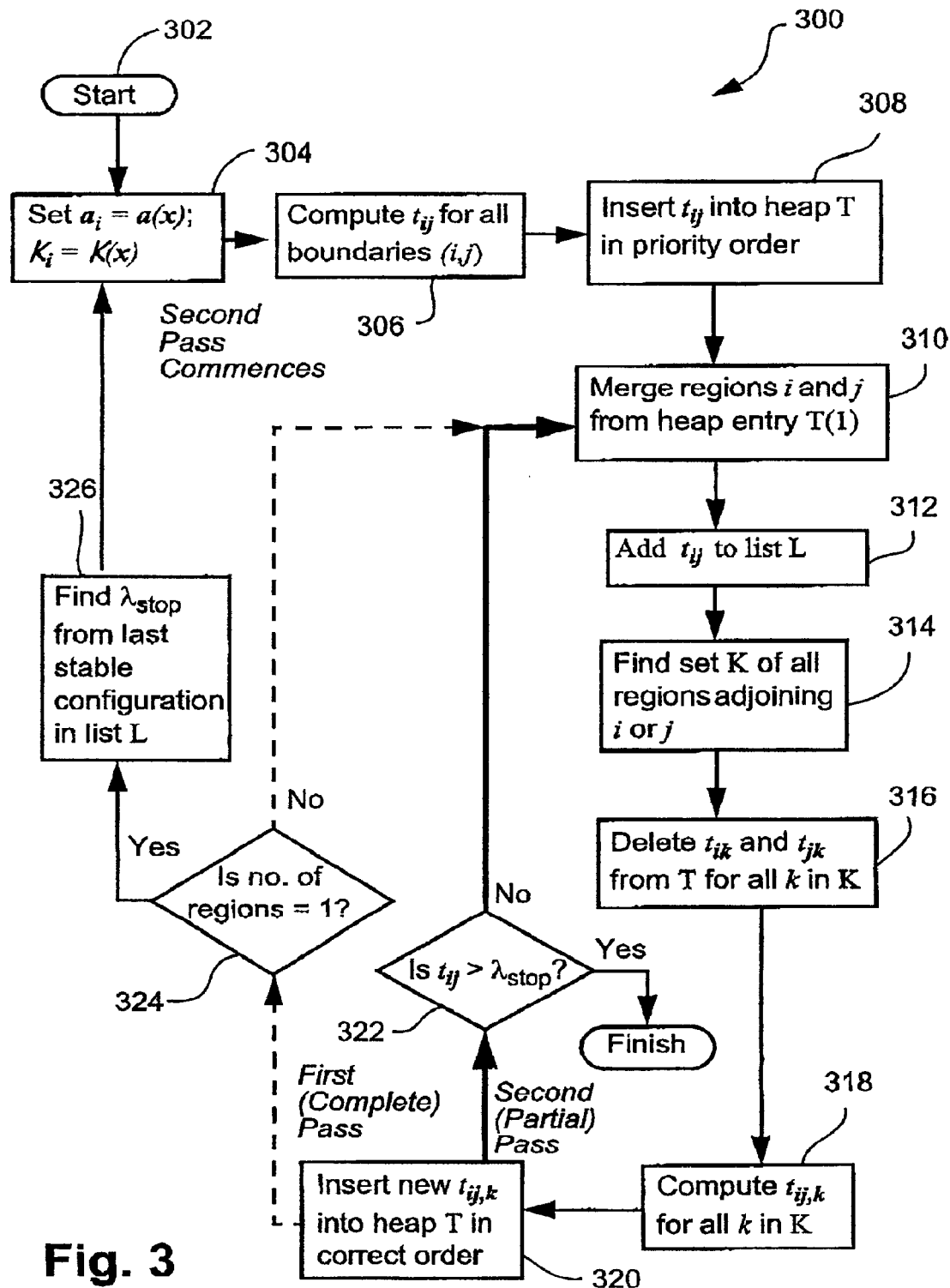
FIG. 3 is a flow chart representing processing steps used in the preferred implementation to determine when to cease the segmentation.

In the preferred implementation, the value of $\lambda_{stop}$ is determined automatically from each image it is applied to, without the need for training, according to the processing method 300 shown in FIG. 3, which implements a preferred form of the region-merging 108 of FIG. 1 This means the value of $\lambda_{stop}$ varies from image to image in a manner determined by the data itself. This approach is more flexible than the use of a single, fixed $\lambda_{stop}$ for all images. It is most useful for the class of images in which a small number of distinct but not necessarily homogeneous foreground objects are ranged against a cluttered (ie. non-homogeneous) background.

To see how $\lambda_{stop}$ is determined, note first that as merging proceeds, the merging cost of the regions being merged generally increases. This increase however is not purely monotonic. In fact, the overall rise in $t_{ij}$ is punctuated by departures from monotonicity, which herein are termed local minima. A local minimum represents the collapse of what might be termed a self-supporting group of adjacent regions. Such occurs if one boundary within the group is removed, and the merging costs for adjacent boundaries then suddenly reduce. In effect, the hypothesis that the regions of the group are part of the same object is confirmed as more regions merge and so $t_{ij}$ decreases. The result is that all the boundaries in the group are removed in quick succession. These self-supporting groups tend to represent the internal structure of objects and background clutter. A measure of merit such as the number of boundaries removed or their total length or the maximum (absolute or relative) decrease in $t_{ij}$ may be assigned to each local minimum.

Figure 2A:
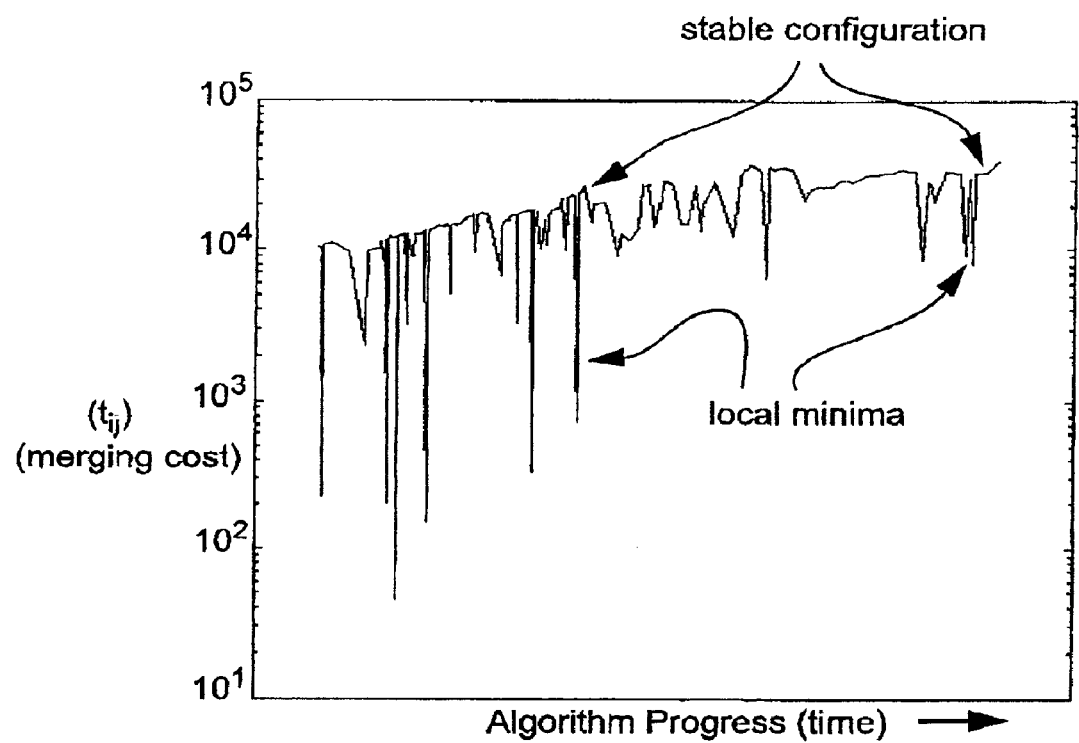
FIG. 2A is a plot of the value of the test statistic as the algorithm proceeds in a typical case.

The point immediately after a local minimum, being a return to substantial monotonicity, is termed herein a stable configuration. Visually, a stable configuration represents a point in the segmentation process at which an area of internal object structure or background clutter has just been removed, and is thus a good potential halting point, Each stable configuration has an associated value of $t_{ij}$. FIG. 2A shows a plot of $t_{ij}$ during part of a segmentation of a real image, showing local minima and stable configurations.

Figure 2B:
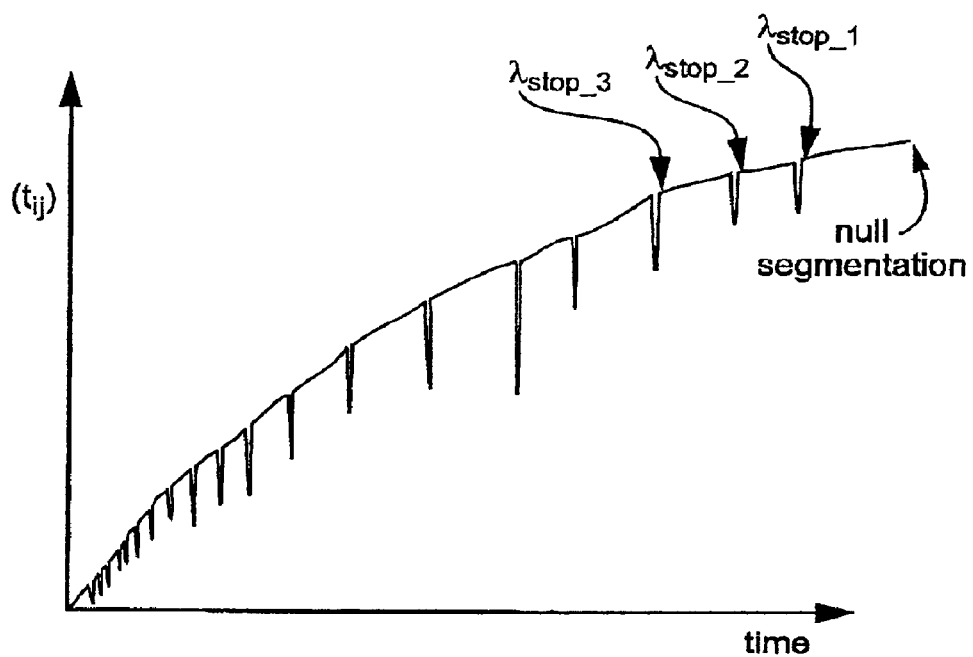
FIG. 2B is a plot similar to FIG. 2A but simplified and shown over an entire segmentation.

If a complete pass is made through the segmentation, in which all regions are merged until only one (the whole image) remains, all local minima and stable configurations for the image may be found automatically by analysing the values of $t_{ij}$. Significant local minima, being those whose measure of merit exceeds a certain threshold, are flagged. The final segmentation stopping value $\lambda_{stop}$ is chosen to be the last such stable configuration. An example of this is seen in FIG. 2B, where an artificial plot of $t_{ij}$ over time is shown for an entire region merging process As can be seen, during the early stages of region merging, local minima are common, giving the plot an erratic behaviour. As the regions become more established and substantial, the local minima frequency reduces until the null segmentation is reached (i.e. the image forms a single region). Those segmentations approaching the null will however be useful since the number of regions will be manageable computationally and most likely will be visually perceptible (eg. a person distinguished from background, or the major body parts (head, torso, arms, legs) of a person distinguished from background). As indicated above, a stable configuration is a desirable location to cease region merging, and FIG. 2B illustrates the identification of a limited number of candidate stopping locations $\lambda_{stop\_1}$, $\lambda_{stop\_2}$, $\lambda_{stop\_3}$, at stable configurations near the null segmentation. The last stable configuration ($\lambda_{stop\_1}$) is typically chosen as the $\lambda_{stop}$, although any of the limited number of candidate stopping locations may be selected depending on the particular image and/or application being processed. Further, where the image has a large number of local minima (e.g. hundreds, thousands or more), the limited number of candidate stopping positions may be significant (eg in the "tens").

At this point, given the underlying assumptions about the image, unwanted internal object structure and background clutter can thus be removed. To achieve this stable configuration (whose $t_{ij}$ value is deemed to be $\lambda_{stop}$ the processing method 300 need only reverse its last few merging operations by restoring the algorithm state appropriately. Alternatively, the merging process may be run again from the start, halting when the value of $t_{ij}$ reaches $\lambda_{stop}$.

The complete method (using the latter, more expensive alternative) is set out as a flow chart in FIG. 3. The method 300 starts at step 302, and step 304 which follows receives the vector-data sets $\bar{a}(x)$ and confidences $K(x)$ for each pixel in the image. Step 306 then computes the test statistic $t_{ij}$ according to Equation 15 for the pixels. Step 308 inserts the test statistics into a heap T in priority order. Steps 310 to 324 are iterated in a loop to group the pixels into regions. Step 310 finds the first entry T(I) in the heap T and merges the corresponding region pair (i,j). Step 312 records the test statistic value $t_{ij}$ in the list L. Step 314 identifies all adjoining regions and step 316 acts to delete the test statistic value corresponding to all the adjoining regions from the heap T. Step 318 follows and creates a new test statistic for each adjoined region. Step 320 then inserts the new $t_{ij}$ into the heap T. Step 324 follows and seeks to detect the null segmentation. If such is not present, control returns to step 310 and steps 310–320 are performed again on the regions.

When all regions have been combined into the null segmentation, step 324 passes control to step 326 which then can identify the $t_{ij}$ value of the last stable configuration, and this is assigned $\lambda_{stop}$. Control returns to step 304 and the pixels again are merged to form regions. With $\lambda_{stop}$ selected, step 320 passes control to step 322 to determine if the merging has reached the stopping point. If so, the method 300 finishes. If not, control is returned to step 310 and further regions are merged, In order to apply the merging algorithm described above to a wide variety of data sources and models, it is necessary to choose a threshold $N_{sig}$, to thereby determine what constitutes a significant local minimum. A stable configuration must follow a significant local minimum according to this definition. In the preferred implementation, a measure of merit is used corresponding to the number of boundaries removed during a local minimum, and $N_{sig}$ defaults to a small integer such as 3. Larger values of $N_{sig}$ remove only larger self-supporting structures and thus leave more internal structure and background clutter intact, and so $N_{sig}$ can be passed as an algorithm parameter to control the depth of segmentation.

Thus in the preferred implementation there is a semantically meaningful halting criterion which, while based on the properties of the image itself, is insensitive to the actual measurement values.

Extension to Three-Dimensional (Volume) Data

An additional benefit of the described processes for segmentation of image data is their ready extension to data defined on higher dimensional spaces. For example, medical images are often recorded as volume data, ie. a three dimensional array of some scalar (or vector) quantity. All that is required to extend the processing algorithm 100 to handle volume data is a definition of the neighbourhood relation between adjacent voxels (the volume equivalent of pixels). The logical extension of the pixel neighbourhood relation to three dimensions allows six neighbours for each voxel (one in each direction of each dimension). Regions may then be deemed to be bounded by surfaces whose areas are readily computable in the same fashion as two-dimensional perimeter lengths, by adding up the boundary edgels as in Equation (6). The same procedures as described above may be applied without alteration to automatically segment volume data into regions of linearly modellable data.

Figure 4:
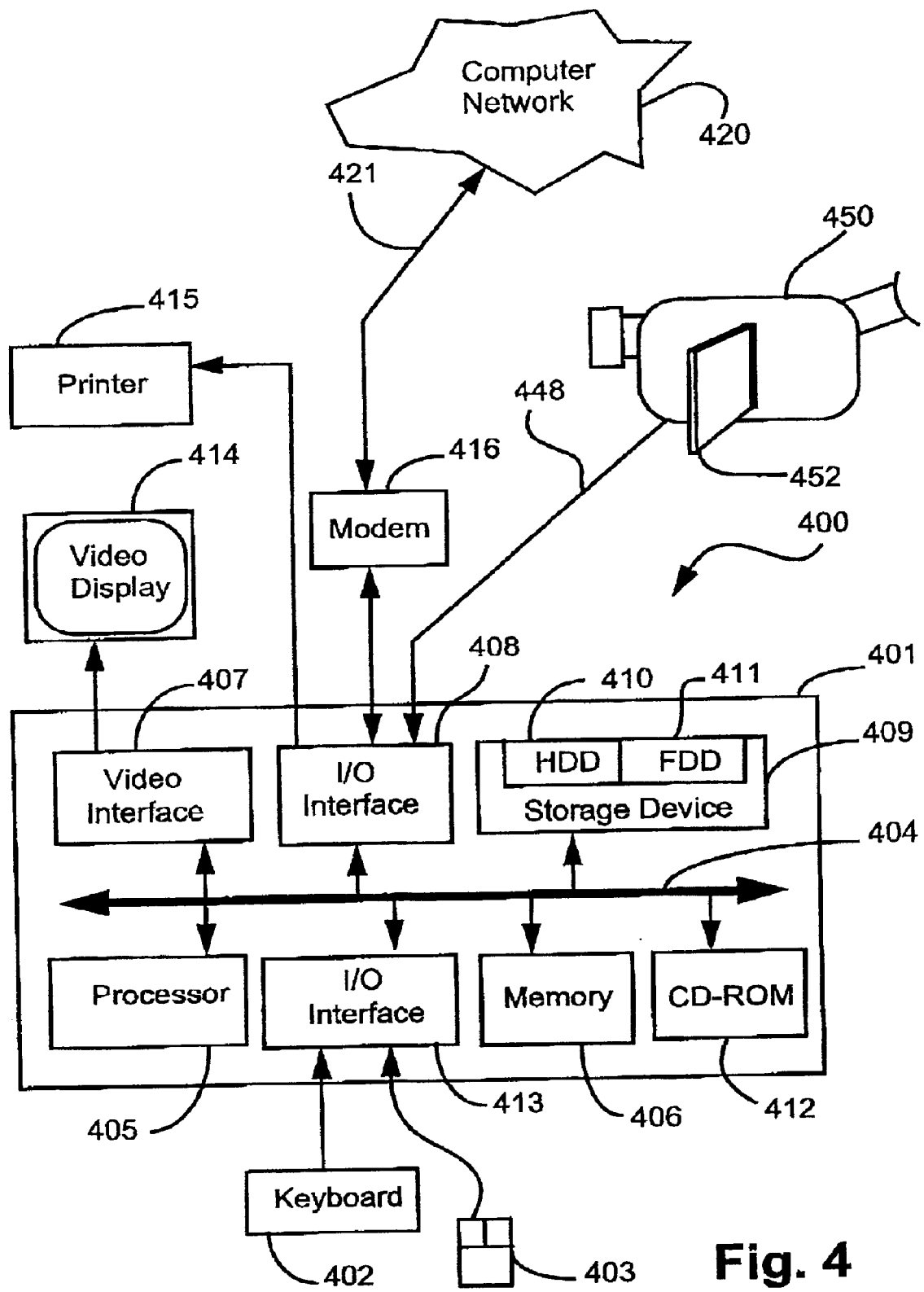
FIG. 4 is a schematic block diagram representation of a computer system in which the preferred implementation may be implemented.

The region-merging and processing methods described above are preferably practiced using a conventional general-purpose computer system 400, such as that shown in FIG. 4 wherein the processes of FIGS. 1 to 3 may be implemented as software, such as an application program executing within the computer system 400. In particular, the steps of the region merging method are effected by instructions in the software that are carried out by the computer. The software may be divided into two separate parts; one part for carrying out the merging methods and another part to manage the user interface between the latter and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for region merging.

The computer system 400 comprises a computer module 401, input devices such as a keyboard 402 and mouse 403, output devices including a printer 415 and a display device 414. A Modulator-Demodulator (Modem) transceiver device 416 is used by the computer module 401 for communicating to and from a communications network 420, for example connectable via a telephone line 421 or other functional medium. The modem 416 can be used to obtain access to the Internet, and other network systems, such as a Local Area Network (LAN) or a Wide Area Network (WAN).

The computer module 401 typically includes at least one processor unit 405, a memory unit 406, for example formed from semiconductor random access memory (RAM) and read only memory (ROM), input/output (I/O) interfaces including a video interface 407, and an I/O interface 413 for the keyboard 402 and mouse 403 and optionally a joystick (not illustrated), and an interface 408 for the modem 416. A storage device 409 is provided and typically includes a hard disk drive 410 and a floppy disk drive 411. A magnetic tape drive (not illustrated) may also be used. A CD-ROM drive 412 is typically provided as a non-volatile source of data. The components 405 to 413 of the computer module 401, typically communicate via an interconnected bus 404 and in a manner which results in a conventional mode of operation of the computer system 400 known to those in the relevant art. Examples of computers on which the implementations can be practised include IBM-PC's and compatibles, Sun Sparestations or alike computer systems evolved therefrom.

Typically, the application program of the preferred implementation is resident on so the hard disk drive 410 and read and controlled in its execution by the processor 405, Intermediate storage of the program and any data fetched from the network 420 may be accomplished using the semiconductor memory 406, possibly in concert with the hard disk drive 410. In some instances, the application program may be supplied to the user encoded on a CD-ROM or floppy disk and read via the corresponding drive 412 or 411, or alternatively may be read by the user from the network 420 via the modem device 416. Still further, the software can also be loaded into the computer system 400 from other computer readable medium including magnetic tape, a ROM or integrated circuit, a magneto-optical disk, a radio or infra-red transmission channel between the computer module 401 and another device, a computer readable card such as a PCMCIA card, and the Internet and Intranets including e-mail transmissions and information recorded on websites and the like, The foregoing is merely exemplary of relevant computer readable mediums. Other computer readable media may be practiced without departing from the scope and spirit of the invention.

The methods described may alternatively be implemented in dedicated hardware such as one or more integrated circuits performing the functions or sub functions and for example incorporated in a digital video camera 420. Such dedicated hardware may include graphic processors, digital signal processors, or one or more microprocessors and associated memories. As seen, the camera 450 includes a display screen 452 which can be used to display the segmented image of information regarding then same. In this fashion, a user of the camera may record an image, and using the processing methods described above, create metadata that may be associate with the image to conveniently describe the image thereby permitting the image to used or otherwise manipulated with a specific need for a user to view the image. A connection 448 to the computer module 401 may be utilised to transfer data to and/or from the computer module 401 for performing the segmentation process.

INDUSTRIAL APPLICABILITY

It is apparent from the above that the embodiment(s) of the invention are applicable to the image processing industries where images may require cataloguing according to their content.

The foregoing describes only one embodiment/some embodiments of the present invention, and modifications and/or changes can be made thereto without departing from the scope and spirit of the invention, the embodiment(s) being illustrative and not restrictive.

In the context of this specification, the word "comprising" means "including principally but not necessarily solely" or "having" or "including" and not "consisting only of". Variations of the word comprising, such as "comprise" and "comprises" have corresponding meanings.

We claim:

1. A method of segmenting an image formed by a plurality of pixels, each pixel being described by a vector having components each relating to a different measured image characteristic, said method comprising the steps of:
   (a) receiving, for each pixel, a plurality of the vector components and a corresponding error covariance representation of that pixel;
   (b) for each pixel, fitting each component and the corresponding covariance representation to a predetermined linear model to obtain a set of model parameters and corresponding confidence representations;
   (c) defining the pixels each to be initial regions of the image;
   (d) merging the regions in a statistical order using the sets of model parameters and confidence representations to obtain a null segmentation of the image;
   (e) analysing a curve formed using the model parameters and corresponding confidence representations to determine an optimal halting criterion at which to cease the merging of the regions; and
   (f) processing said merging of the initial regions to halt when the optimal halting criterion is reached.

2. A method according to claim 1, wherein step (f) comprises re-executing the merging of the initial regions using said model parameters and confidence representations, and halting when said optimal halting criterion is reached.

3. A method according to claim 1, wherein sub step (e) comprises identifying returns to monotonicity from local minima in the curve and selecting a predetermined the return approaching the null segmentation as the optimal halting criterion.

4. A method according to claim 3, wherein step (f) comprises re-executing the merging of the initial regions using the model parameters up until the predetermined return is reached.

5. A method according to claim 1, wherein the statistical order is determined using an order of minimum covariance-normalised vector distance between adjacent regions of the segmentation.

6. A method according to claim 1, wherein the statistical order is determined using a length of a common boundary between adjacent regions.

7. A method according to claim 1, wherein the statistical order is determined by dividing a covariance-normalised vector distance between adjacent regions of the segmentation by a length of a common boundary between adjacent regions, and ordering the resulting quotients.

8. A method according to claim 7, wherein each quotient forms a test statistic, a record of which is retained at each merging step to form the curve.

9. A method according to claim 1, wherein the plurality of vector components comprise at least two of colour, range and motion.

10. A method according to claim 9, wherein the colour vector component comprises at least one colour channel of a colour space in which the image can be reproduced.

11. A method for unsupervised selection of a stopping point for a region-merging segmentation process, said method comprising the steps of:
   (a) analysing a graph of merging cost values to identify departures from substantial monotonicity of the graph; and
   (b) selecting the stopping point to be a merging cost value corresponding to a return to monotonicity of the graph, the selected stopping point being associated with one of a limited plurality of final ones of the departures in the region merging process.

12. A method according to claim 11, wherein the selected stopping point corresponding to a return associated with the final departure.

13. A method according to claim 11, wherein the departures are larger than a predetermined threshold.

14. A method according to claim 11, wherein the merging cost values comprise an ordered series of test statistics, each test statistic being formed, for each adjacent pair of regions in the segmented image, by dividing a covariance-normalised vector distance between the pair by a length of a common boundary between the pair.

15. Apparatus for segmenting an image formed by a plurality of pixels, each pixel being described by a vector having components each relating to a different measured image characteristic, said apparatus comprising:
   means for receiving, for each pixel, a plurality of the vector components and a corresponding error covariance representation of that pixel;
   means for fitting, for each pixel, each component and the corresponding covariance representation to a predetermined linear model to obtain a set of model parameters and corresponding confidence representations;
   defining means for defining the pixels each to be initial regions of the image;
   merging means for merging the regions in a statistical order using the sets of model parameters and confidence representations to obtain a null segmentation of the image;
   curve analysing means for analysing a curve formed using the model parameters and corresponding confidence representations to determine an optimal halting criterion at which to cease the merging of the regions; and
   processing means for processing the merging of the initial regions to halt when the optimal halting criterion is reached.

16. Apparatus according to claim 15, wherein said processing means comprises means for re-executing the merging of the initial regions using the model parameters and confidence representations, and halting when the optimal halting criterion is reached.

17. Apparatus according to claim 15, wherein said curve analysing means comprises means for identifying returns to monotonicity from local minima in the curve and means for selecting a predetermined the return approaching the null segmentation as the optimal halting criterion.

18. Apparatus according to claim 17, wherein said processing means comprises means for re-executing the merging of the initial regions using the model parameters up until the predetermined return is reached.

19. Apparatus according to claim 15, wherein the statistical order is determined using an order of minimum covariance-normalised vector distance between adjacent regions of the segmentation.

20. Apparatus according to claim 15, wherein the statistical order is determined using a length of a common boundary between adjacent regions.

21. Apparatus according to claim 15, wherein the statistical order is determined by dividing a covariance-normalised vector distance between adjacent regions of the segmentation by a length of a common boundary between adjacent regions, and ordering the resulting quotients.

22. Apparatus according to claim 21, wherein each quotient forms a test statistic, a record of which is retained at each merging to form the curve.

23. Apparatus according to claim 15, wherein the plurality of vector components comprise at least two of colour, range and motion.

24. Apparatus according to claim 23, wherein the colour vector component comprises at least one colour channel of a colour space in which the image can be reproduced.

25. Apparatus for unsupervised selection of a stopping point for a region-merging segmentation process, said apparatus comprising:

means for analysing a graph of merging cost values to identify departures from substantial monotonicity of the graph; and means for selecting the stopping point to be a merging cost value corresponding to a return to monotonicity of graph, the selected stopping point being associated with one of a limited plurality of final ones of the departures in the region merging process.

26. Apparatus according to claim 25, wherein the selected stopping point corresponds to a return associated with the final departure.

27. Apparatus according to claim 25, wherein the departures are larger than a predetermined threshold.

28. Apparatus according claim 25, wherein the merging cost values comprise an ordered series of test statistics, each test statistic being formed, for each adjacent pair of regions in the segmented image, by dividing a covariance-normalised vector distance between the pair by a length of a common boundary between the pair.

29. A program for making a computer execute a procedure to segment an image formed by a plurality of pixels, each pixel being described by a vector having components each relating to a different measured image characteristic, said program comprising:

code for receiving, for each pixel, a plurality of the vector components and a corresponding error covariance representation of that pixel;

code for, for each pixel, fitting each component and the corresponding covariance representation to a predetermined linear model to obtain a set of model parameters and corresponding confidence representations;

code for defining the pixels to each be initial regions of the image;

code for merging the regions in a statistical order using the sets of model parameters and confidence representations to obtain a null segmentation of the image;

code for analysing a curve formed using the model parameters and corresponding confidence representations to determine an optimal halting criterion at which to cease the merging of the regions; and code for processing the merging of the initial regions to halt when the optimal halting criterion is reached.

30. A program for making a computer execute a procedure for unsupervised selection of a stopping point for a region-merging segmentation process, said program comprising:

code for analysing a graph of merging cost values to identify departures from substantial monotonicity of the graph; and code for selecting the stopping point to be a merging cost value corresponding to a return to monotonicity of the graph, the selected stopping point being associated with one of a limited plurality of final ones the departures in the region merging process.

31. A program according to claim 30, wherein the selected stopping point corresponding to a return associated with the final departure.

32. A program according to claim 30, wherein the departures are larger than a predetermined threshold.

33. A program according to claim 30, wherein the merging cost values comprise an ordered series of test statistics, each test statistic being formed, for each adjacent pair of regions in the segmented image, by dividing a covariance-normalised vector distance between the pair by a length of a common boundary between the pair.

* * * * *

UNITED STATES PATENT AND TRADEMARK OFFICE
CERTIFICATE OF CORRECTION

PATENT NO.    : 6,947,590 B2
DATED         : September 20, 2005
INVENTOR(S)   : Julian Frank Andrew Magarey et al.

It is certified that error appears in the above-identified patent and that said Letters Patent is hereby corrected as shown below:

Column 4,
Line 16, "designation." should read -- destination. --.
Line 23, "any as" should read -- any --.

Column 5,
Line 46, "the to" should read -- the --.

Column 6,
Line 48, "ally" should read -- any --.

Column 8,
Line 46, "$\lambda$, <" should read -- ($\lambda$, < --.

Column 10,
Line 28, "(eg" should read -- (e.g., --.
Line 32, "$\lambda_{stop}$" should read -- $\lambda_{stop}$), --.
Line 39, "follows receives" should read -- follows receipt of --.

Column 12,
Line 12, "alike" should read -- like --.
Line 46, "associate" should read -- associated --.
Line 47, "used" should read -- be used --.

Column 13,
Line 31, "predetermined the return" should read -- predetermined return --.

Column 14,
Line 4, "corresponding" should read -- corresponds --.
Line 47, "predetermined the return" should read -- predetermined return --.

Column 15,
Line 15, "graph," should read -- said graph, --.

UNITED STATES PATENT AND TRADEMARK OFFICE
CERTIFICATE OF CORRECTION

PATENT NO. : 6,947,590 B2
DATED : September 20, 2005
INVENTOR(S) : Julian Frank Andrew Magarey et al.

It is certified that error appears in the above-identified patent and that said Letters Patent is hereby corrected as shown below:

Column 16,
Line 24, "ones" should read -- ones of --.
Line 27, "corresponding" should read -- corresponds --.

Signed and Sealed this

Twenty-first Day of February, 2006

JON W. DUDAS
*Director of the United States Patent and Trademark Office*